June 18, 1963

S. W. WILCOX 3,094,277

VOTING MACHINE

Filed Dec. 9, 1960

INVENTOR.
STANLEY W. WILCOX
BY
Mason, Kolehmainen,
Rathburn and Wyss
ATTORNEYS.

June 18, 1963     S. W. WILCOX     3,094,277

VOTING MACHINE

Filed Dec. 9, 1960     6 Sheets-Sheet 3

INVENTOR.
STANLEY W. WILCOX
BY
Mason, Kolehmainen,
Rathburn and Wyss.
ATTORNEYS.

June 18, 1963

S. W. WILCOX

3,094,277

VOTING MACHINE

Filed Dec. 9, 1960

INVENTOR.
STANLEY W. WILCOX
BY
Mason, Kolehmainen, Rathburn and Wyss
ATTORNEYS

United States Patent Office 3,094,277
Patented June 18, 1963

3,094,277
VOTING MACHINE
Stanley W. Wilcox, Tulsa, Okla., assignor to Seismograph Service Corporation, Tulsa, Okla., a corporation of Delaware
Filed Dec. 9, 1960, Ser. No. 74,888
42 Claims. (Cl. 235—50)

This invention relates generally to voting machines and is particularly concerned with a light, compact, easily transportable, relatively inexpensive voting machine.

Voting machines presently in use employ a voting panel divided into columns and rows providing a large number of selecting positions. At each selecting position a manually operable selector is provided for operation by the voter in making his choice. These machines require elaborate interlocks to satisfy all of the conditions which may be necessary in the various jurisdictions using voting machines. Thus, it is necessary to interlock the selectors so that in a contest where a single choice must be made between two or more candidates, it will be impossible for the voter to operate more than one selector. Moreover, in some instances the voter is required to cast votes for two or more candidates of a relatively large group and in such cases it is necessary that interlocks be provided to prevent overvoting, that is, the arrangement must be such that after the required number of choices have been made, it is impossible to operate any additional selectors. In addition, in some elections as, for example, in primary elections or in decisions on questions where only a particular class of voters such as property holders may participate, the machine must be set up prior to the casting of each vote so that the voter may make choices only on those issues in which he is eligible. Interlocks must be provided to prevent the casting of votes on other issues. Thus, it is apparent that the interlock mechanism is extremely complex and adds considerably to the size and weight of the machine. Moreover, since each election presents a completely different set of interlock problems, it is obvious that the task of setting up or programming the machine is exceedingly laborious and time consuming and can be performed only by highly skilled persons. As a result of the complexity of construction, the voting machines now in use are very expensive, can be maintained and/or repaired only by skilled persons, are large, heavy and bulky so that they cannot be transported easily to and from the voting station before and after elections and, in addition, they occupy a tremendous amount of storage space between elections. In addition, the weight of these machines makes them suitable for use only in buildings which have floor areas capable of supporting them, a problem which in some instances leads to the location of a voting station at a point not centrally or conveniently located in the area served. Despite all of these glaring disadvantages, the basic design of voting machines has not changed in the last half century. Weighed against these disadvantages are the rapidity with which the vote may be cast and registered and the rugged, relatively trouble-free construction.

The primary object of the present invention is to provide a voting machine which retains to a large extent the advantages of the machines now in use but at the same time avoids all of the aforementioned disadvantages.

A further object of the invention is to provide a voting machine of small size and weight which is inexpensive to manufacture when compared with machines presently in use.

Another object of the invention is to provide a voting machine which prevents overvoting or casting of votes on issues for which the voter is not qualified but which, at the same time, avoids the use of complex interlocks between the selectors of the machine.

The invention has for another object the provision of a voting machine which is very easy to set up or program for an election.

The foregoing and other objects are realized, in accordance with the present invention, by providing a voting machine having a front panel formed by a plurality of side by side columns each supporting a strip extending lengthwise and containing a list of different issues or candidate groups to be decided by the voter. Each group is divided into several selecting positions listing the different alternatives or candidates for that particular office. The candidate groups are separated by stop pins which are mounted in fixed positions upon the column but which can be placed in any desired position during programming. Mounted for sliding movement upon the column are several voting keys or selectors there being provided in each office group a number of keys exactly equal to the number of votes being cast in that group. Thus, in the usual office group where a single selection must be made from a group of candidates, only one voting key is provided and this key may be moved from a neutral position adjacent one of the stop pins to a selecting position adjacent the name of the candidate selected by the voter. This key cannot be moved past the office stop pins and, hence, only one vote may be cast within the office group. If more than one vote is to be cast within an office group, several voting keys equal in number to the total number of votes to be cast are inserted between the stop pins defining that group. If cumulative voting is permitted, the name of each candidate will appear more than once on the candidate strip and, hence, the voter may divide his votes in any manner which he desires by giving all or several of his votes to a single candidate or by splitting them among several candidates. Each column also supports detents for holding the voting keys in any position selected.

The machine is programmed by placing the office stop pins at desired positions defining the office groups, inserting the voting keys into each column and placing the candidate strips in position. The stops and the candidate strips cannot be moved after assembly and while the voting keys are movable along the columns after the machine is locked for use in the election.

To begin the voting operation, the voter inserts a ballot card which is held in position within the machine while the voter manually moves the voting keys to make the selections. After the selections have been made, the voter starts the registering operation by depressing a vote switch which starts the movement of a scanning device along the rear of the voting panel and, at the same time, begins the closing of a cover or curtain for the front panel of the machine. In one form of the invention the voter's selections are recorded by punching holes in a ballot card, with the ballot cards being collected for subsequent counting at a tabulating station. In this form of the invention, as the scanning device moves from row to row along the panel, the ballot card is advanced step by step past a series of punches each of which is electrically connected to one of the columns. As the scanning device reaches each row, in each column where the voting key has been moved to a selecting position, an electrical circuit is completed to the punch associated with that column and, hence, a hole is punched in the ballot card at a position corresponding to that of the voting key selected. Provision is also made for punching the card with holes identifying the voting station at which the ballot was cast.

In a second form of the invention, the voter's selections are registered or recorded directly upon tally counters of conventional construction. In this form, a set of tally counters are provided, one for each selecting position on the panel, with the counters being arranged in rows respectively corresponding to the rows of panel selecting positions. As the scanning device advances from row to row along the panel, a second scanner moves from row to row along the counters. The two scanning devices are electrically interconnected at each column position and, hence, when the first scanning device encounters a selector in a selecting position, an electrical circuit is completed to the associated counter thus causing the latter counter to advance one count to indicate that a vote has been cast for the candidate whose name appears adjacent the selecting position.

The invention, both as to its organization and manner of operation, together with further objects and advantages thereof will best be understood by reference to the following detailed description taken in conjunction with the accompanying drawings wherein.

Figure 1:
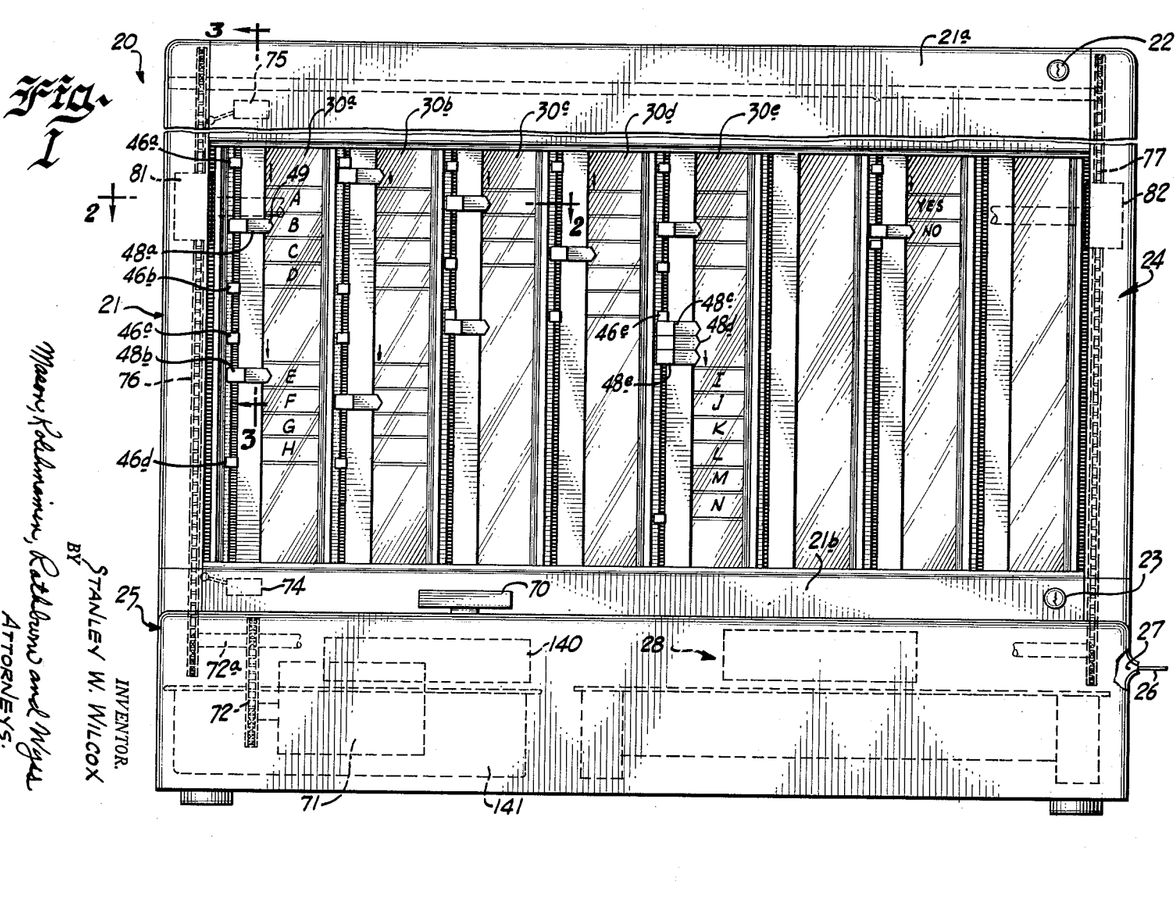
FIG. 1 is a front elevational view illustrating a voting machine characterized by the features of the present invention.

Referring now to the drawings and first to FIG. 1, one form of the voting machine of the present invention is there identified generally by the reference numeral 20 and comprises a substantially enclosed housing 21 formed by a number of panels locked together in any suitable manner as, for example, by means of interlocks controlled by key operated locks such as those indicated at 22 and 23 on the upper and lower panels 21a and 21b, respectively, of the housing. In the event that the voting machine breaks down during the course of an election or, if for any other reason, access may be desired to the interior of the housing 21, one or more of the panels may be removed by unlocking the appropriate key operated lock or locks.

The housing 21 defines an upper, generally vertically extending voting panel section identified generally by the reference numeral 24 and a lower ballot or card handling section 25. In the form of the invention shown in FIG. 1, the selections made by the voter are adapted to be recorded or registered upon a ballot paper or card with all of the cards or papers being collected for subsequent transport to a central counting or tabulating station where the results of the election may be computed very rapidly by running the ballot cards through conventional punch card controlled counting or tabulating machines. In the operation of the machine shown in FIG. 1, each voter is provided with a ballot card 26, which may be of the type customarily used in tabulating or computing operations, and this card is inserted into the voting machine 20, for example, through a card receiving opening 27 provided at one side of the machine. The ballot card 26 is inserted into a card receiving and punching mechanism indicated generally by the reference numeral 28 and is held in fixed position therein while the voter makes his selections upon the front panel of the upper section 24.

In accordance with an important feature of the present invention, the front face or panel of the upper section 24 is made up of a plurality of side by side vertically extending columns 30a, 30b, 30c, etc. While eight vertical columns are shown, it will be apparent that this is merely for illustration since in actual practice any desired number of columns may be used. The ballot card 26 contains a number of lengthwise columns equal in number and respectively corresponding to the columns 30a, 30b, 30c, etc. of the voting panel.

Figure 2:
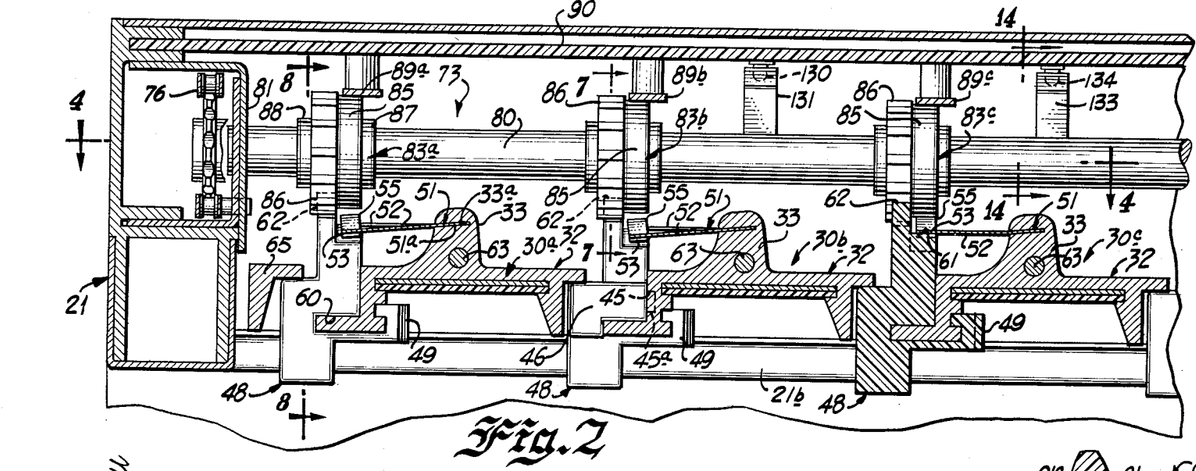
FIG. 2 is an enlarged, fragmentary sectional view taken along a line substantially corresponding to the line 2—2 of FIG. 1.
Figure 5:
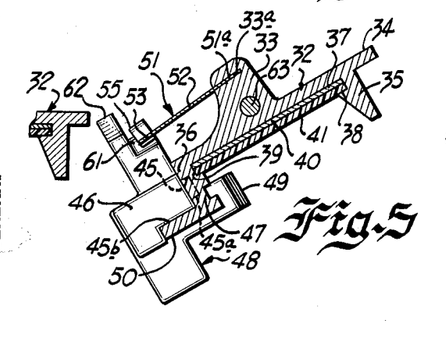
FIG. 5 is a fragmentary, sectional view showing one of the columns making up the front panel of the voting machine in its outwardly pivoted position as used in setting up the machine prior to an election.

As is best shown in FIGS. 2 and 5 of the drawings, each of the columns 30a, 30b, etc., comprises an elongated member preferably formed of an extruded material such as aluminum. The extrusion is such that each column comprises a central body portion 32 having an inwardly extending, longitudinal rib 33 and a laterally extending shoulder 34. The column further comprises a forwardly and longitudinally extending flange or leg 35 at one side and a second forwardly extending leg 36 extending along the entire length at its other side. A channel 37 formed by elongated recesses 38 and 39 respectively formed in the legs 35 and 36 receives a printed or written candidate strip 40 containing different offices or propositions to be decided by the voter. Thus, for example, if the election is a national election, this strip may contain an office title such as "President" and therebeneath may appear the different candidates competing for this office. The office title and the candidates for the office will be referred to hereinafter as an "office group." However, it should be understood that the term "office group" may also refer to propositions on which a yes or no answer is required as, for example, on bond issues, constitutional amendments or the like. Each of the candidate positions or voting positions in each office group will be referred to hereinafter as a selecting position. Each of the channels 37 may also receive a transparent cover 41 overlying the printed candidate strip 40 for the purpose of preventing the latter strip from being marked or damaged by the voter using the machine.

The leg 36 contains a series of vertically spaced stop receiving recesses 45 therein for receiving office stops 46 which divide the different office groups of each column. Each office stop comprises a block having an outwardly protruding pin 45a (FIG. 5) at one end for accommodation within any desired one of the recesses 45. The front face of the block is recessed as indicated at 45b to seat against a laterally extending longitudinal flange 50 on the leg 36. The leg 36 is further provided with an elongated longitudinally extending guide channel or recess 47 for accommodating one or more voting keys or selectors 48 by means of which the voter makes his selections in a manner which will become obvious from the following description.

To consider the operation of the voting machine of the present invention, let it be assumed that the column 30a contains two office groups, namely, an office group in which the voter must select between candidates A, B, C and D and a second office group in which the voter must choose between candidates E, F, G and H. Let it be further assumed that the voter is entitled to vote for only one of the four candidates in each office group. Thus, under these conditions, the candidate strip 40 inserted into the receiving channel 37 of the column 30a will contain at the top a first office title listing the title of the office for which the candidates A, B, C and D are running and, in addition, will contain beneath this first office title four selecting positions respectively listing the four different candidates. Below the first office group will be a second office title and four selecting positons listing the four candidates for that particular office. A pair of stop pins 46a and 46b are inserted within appropriate openings 45 above and below the first office group with the stop pin 46b being provided at a position adjacent to but immediately below the bottom selecting position containing the name of the candidate D. The upper stop pin 46a lies above the selecting position for the candidate A and is separated therefrom by one additional position. A voting key 48a is adapted to slide along the column 30a between the two stops 46a and 46b but obviously this key cannot pass either of the stops. The key is movable from a neutral or non-voting position located adjacent the upper stop 46a to any one of the selecting positions wherein an outer pointer or indicator 49 on the key overlies one of the candidate titles A, B, C or D. The voter exercises his choice between the four candidates by moving the key to a position adjacent the candidate selected. Since the voter is provided with only one key for this office group, he may, of course, select only one of the four candidates and, as a consequence, it is not necessary to provide an interlock arrangement for preventing further voting in this office group. A simlar situation exists in the second office group of the column 30a where a second voting selector or key 48b is provided for sliding movement along the column between the stops 46c and 46d. The number of selecting positions available in each of the columns is, of course, determined solely by the height of the column and the space occupied by each selecting position. Obviously, any suitable number of selecting positions may be provided but in one form of the present invention, thirty such positions were selected although in the form of the invention illustrated in FIG. 1 a lesser number is shown. The selecting positions of the columns 30a, 30b, 30c, etc., are horizontally aligned to form different horizontal rows on the front panel of the voting machine.

In cases where the voter is permitted to exercise more than one choice in a particular office group as, for example, in the lower office group of the column 30d, several keys may be provided. For example, in the office group shown at the bottom of the column 30e, the voter is permited to select between any three of six candidates I, J, K, L, M and N. This selection is, of course, made by moving each of three keys 48c, 48d and 48e from their neutral positions adjacent the upper office stop 46e to selecting positions adjacent the names of the candidates selected. If cumulative voting is not permitted, the names of the candidates I, J, K, L, M and N will appear only once and, hence, only one vote may be cast for any one candidate. However, if cumulative voting is permissible, that is, if the voter may cast more than one of his votes for a single candidate, then the names of the candidates will be listed in each office group more than once. In the case illustrated in column 30e, if the voter is permitted to cast all three of his votes for one candidate, then the name of each candidate is listed three times and, if the voter so desires, he may cast three votes for his chosen candidate by moving the three voting keys to positions respectively adjacent the three listings of that particular candidate. After the voter has moved all three of the keys 48c, 48d and 48e to a selecting position, he cannot, of course, cast additional votes for other candidates and, hence, overvoting is prevented without the use of elaborate interlocks between the three voting keys.

Figure 3:
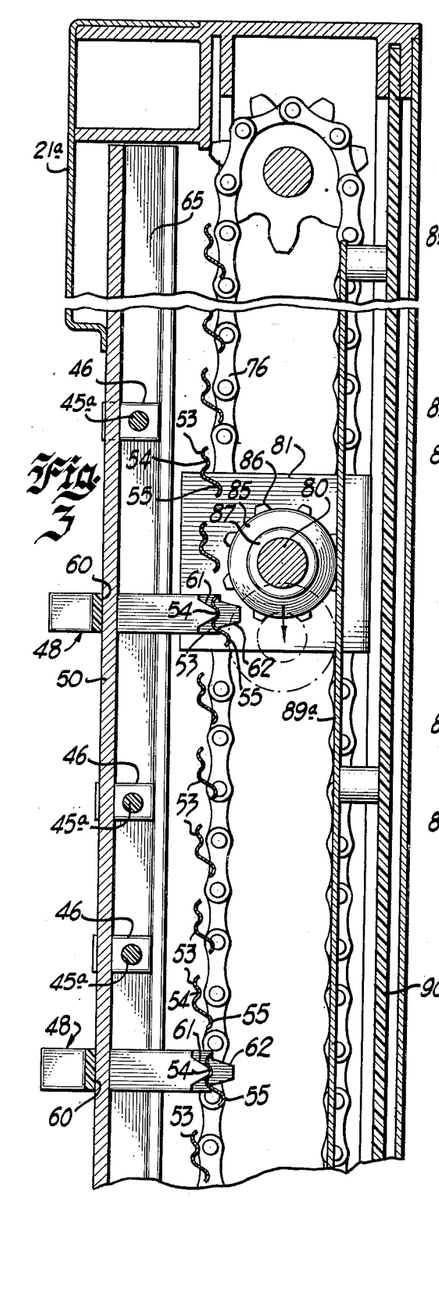
FIG. 3 is an enlarged, fragmentary sectional view taken along a line substantially corresponding to the line 3—3 of FIG. 1.
Figure 4:
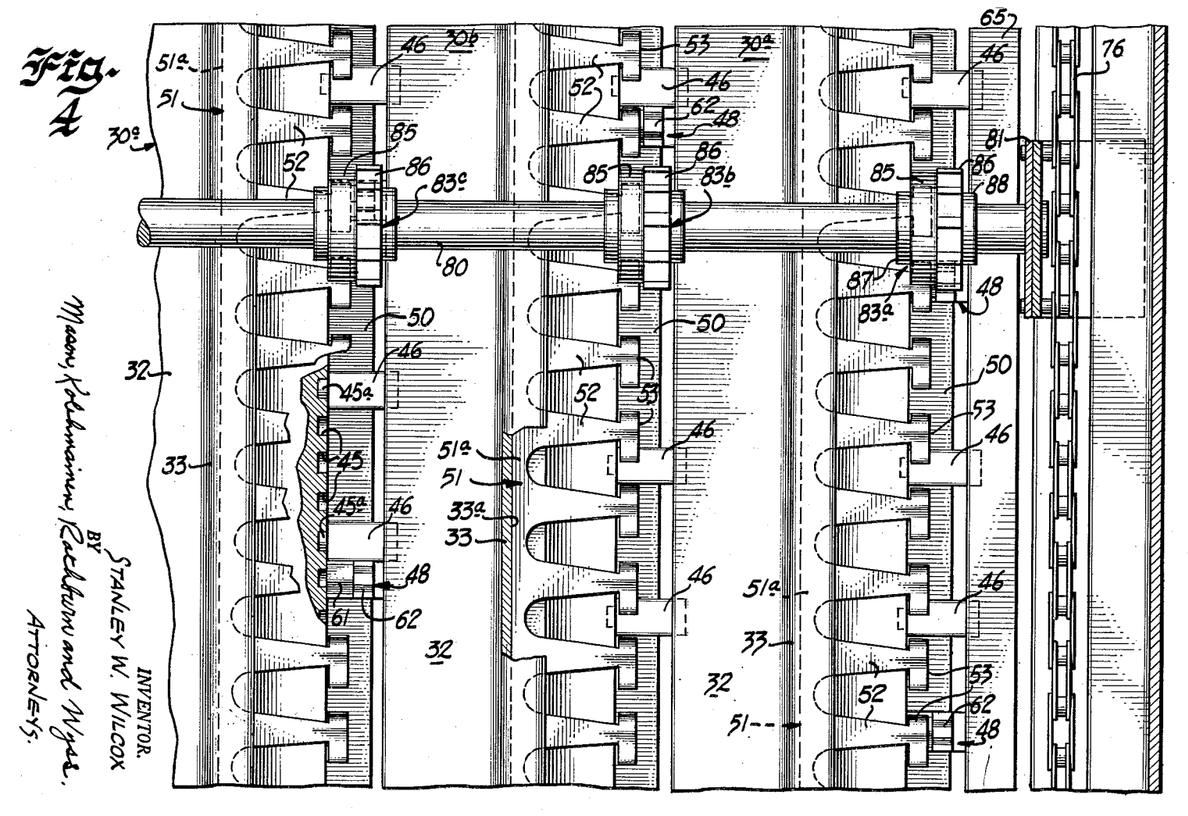
FIG. 4 is a fragmentary, sectional view taken along a line substantially corresponding to the line 4—4 in FIG. 2 assuming, of course, that the latter shows the entire structure.
Figure 8:
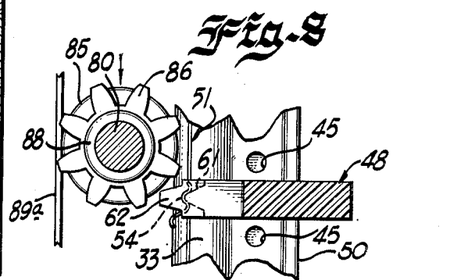
FIGS. 8 and 9 are fragmentary views illustrating the operation of the key restoring gear during the scanning or detecting sweep of the scanning rail.

The voting keys are held in the neutral and selecting positions by detent means 51 associated with each of the columns. This detent means may take the form of an elongated continuous strip having one end 51a received within a longitudinally extending channel 33a formed in the rib 33 with the strip being secured within this channel in any suitable manner as, for example, by means of spaced screws (not shown). The elongated strip contains a plurality of laterally extending detent fingers 52 extending outwardly from the end 51a with each finger carrying at its outer end a key engaging portion 53 (FIGS. 2, 3, 4 and 5). Each detent finger extends outwardly from the continuous end 51a for a distance such that its key engaging portion 53 is disposed in the path of sliding movement of the voting keys on the column. The detent fingers are normally flexed or biased to occupy the position shown in FIG. 5 (and also shown for the columns 30a and 30b in FIG. 2). When a voting key is moved over a detent finger, the finger is flexed inwardly and if the key is stopped at a selecting position, it seats within the key holding notch 54 and is thus resiliently held with the detent finger occupying the position shown in column 30c in FIG. 2. To this end, as is best shown in FIGS. 3 and 8 of the drawings, each of the key engaging portions 53 is bent to form a key holding notch 54 and a wiping finger notch 55. The detent fingers 52 are vertically spaced apart so the notch portions 54 of adjacent fingers are separated by a distance corresponding to the width of one of the selecting positions and the detent fingers are so oriented with respect to the holes 45 for the stops that when a voting key is seated against a stop, it is also seated within a notch 54 on a detent finger.

Figure 6:
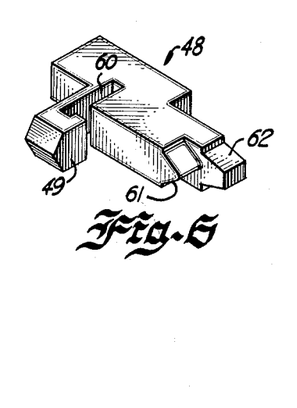
FIG. 6 is a perspective view illustrating a voting key or selector which may be used in the voting machine shown in FIG. 1.

Turning now to the construction of the voting key and referring particularly to FIG. 6 of the drawings, it will be observed that this key or selector may comprise a generally rectangularly shaped body member having the pointer 49 referred to above extending laterally outward therefrom to overlie the flange 50 on the column. The latter flange extends loosely through a guide channel 60 formed in the key to permit the sliding movement of the key along the channel but, at the same time, to prohibit removal of the key by the voter and also to limit lateral key movement. The rearwardly extending portion of the voting key is provided with a detent operating ear 61 and a key restoring tooth 62 with the tooth protruding outwardly from the key somewhat further than the ear.

For the purpose of permitting assembly of the keys and the stops on the column during programming prior to the election, each column is mounted for pivotal movement about a vertical axis upon a pivot rod 63 extending vertically through the rib 33 and into suitable rod receiving openings formed in fixed upper and lower frame members (not shown) of the housing 21. Of course, the rod 63 need not extend entirely through the rib 33 since, in the alternative, outwardly extending pins could be provided at both ends of the column. In order to permit the columns to be pivoted outwardly for the purpose of programming, the panel members 21a and 21b may be removed by operation of the key operated locks 22 and 23 whereupon each column may be turned in a counterclockwise direction from the position shown in FIG. 2 to that shown in FIG. 5. The programming is started by pivoting all of the columns outwardly beginning with the column at the extreme right side of the machine as viewed in FIG. 1 whereupon the stops and the selectors or voting keys may be inserted in the proper order. Thus, to program the column 30a described above, the candidate strip 40 and transparent cover 41 for that column are slipped into the channel 37 and the stop 46d is inserted at the proper position below the lowermost office group whereupon the voting key 48b is slid onto the column by dropping it from the top. This is accomplished by placing the voting key channel 60 over the flange 50 and sliding the voting key downwardly over the detent fingers 52 and along the column. The stop 46c is next inserted at the proper position for limiting the upward movement of the key 48b. The lowermost stop 46b of the upper office group is then assembled and the voting key 48a is placed on the column in the manner previously described. Finally, the office stop 46a is placed in position to limit the upward movement of the key 48a. After all of the columns have been properly programmed in the manner described, they are pivoted back to the positions shown in FIG. 2 beginning with the column 30a at the left side of the machine. The inward or clockwise pivoting movement of the column 30a is limited by engagement of the voting keys of this column with a vertical angle brace 65 extending along the left side of the voting panel as viewed in FIG. 1. The inward turning of the column 30b is limited by engagement of its keys with the shoulder 34 on the channel 30a and so on. After all of the columns have been programmed or set up and pivoted inwardly, the panels 21a and 21b are again locked in position and, since these panels overlie the upper and lower ends of all of the columns, the columns cannot be pivoted outwardly during the course of an election.

After the voter has made his selections upon the voting panel of the machine, his choices are adapted to be recorded or registered as, for example, by punching or otherwise marking the ballot card. The registering operation is initiated by the actuation of a manually operated "Vote" switch 70 which is operated by the voter as soon as he has completed his selections. Operation of the "Vote" switch completes an electrical circuit (not shown) to a drive motor 71 having its output shaft connected through suitable reduction gearing and through a sprocket and chain arrangement 72 to drive a scanning mechanism indicated generally by the reference numeral 73. The scanning mechanism is swept along the rear of the voting panel first in a sensing or vote registering direction and remains at the bottom of the panel until it is returned at the start of the next voting cycle by the insertion of a properly positioned ballot card as is disclosed in copending application Serial No. 74,887, filed simultaneously herewith by the present applicant and Edward J. Crossland which application is assigned to the same assignee as the present invention. During the return sweep of the scanning mechanism 73, the voting keys are all returned automatically from their selecting positions to their neutral positions ready for the next voter's selections. The secrecy of the ballot may be preserved by use of a cover for the front panel in the manner described in copending application Serial No. 74,825 also assigned to the same assignee as the present invention.

In the form of the invention illustrated in the drawings, the scanning mechanism 73 begins its sensing or vote detecting sweep at the top of the voting panel section 24 and moves downwardly along the rear of the front panel until it engages a limit switch 74 at which time the drive to the motor 71 is interrupted. When the scanning mechanism is moved upwardly to return to its original position, an upper limit switch 75 is engaged to stop the motor drive. It should be apparent that by appropriate changes in design the sensing sweep could begin at the bottom of the panel although in this case the voting keys would be in their neutral positions when they were located adjacent the lower stop of each office group.

The mechanical drive for the scanning mechanism 75 extends from the output shaft 72a of the sprocket and chain 72 to a pair of sprocket and chain drives including vertically extending chains 76 and 77 located at opposite sides of the voting machine. The scanning mechanism itself comprises a horizontal rail 80 mounted at its opposed ends upon carriage assemblies 81 and 82 respectively carried by the chains 76 and 77. The carriage assemblies are fixedly secured to the chains and are guided for vertical movement within suitable guide channels provided along the sides of the voting machine housing 21. The rail 80 carries a plurality of spaced apart wiping and restoring units 83a, 83b, 83c, etc. there being one such unit for each of the columns. Each unit comprises a conducting ring 85 and a gear 86 the latter being mounted for limited rotation upon the rail 80 and having a greater freedom of rotation in a counterclockwise direction as viewed in FIGS. 8 and 9 than in the clockwise direction as is described more fully hereinafter. Each of the units 83a, 83b, etc. is held against movement longitudinally along the rail by a pair of spaced apart collars 87 and 88. The conducting rings 85 of the different units are electrically isolated in any suitable manner as, for example, by using inner insulating rings separating the outer conducting rings from the rail or by making the rail of insulating material. The gears 86 may also be formed of insulating material. In any event, each of the conducting rings rolls along and electrically contacts a conducting strip 89a, 89b, etc., extending vertically of the voting machine with all of the contact strips being mounted upon a common support panel 90 secured in fixed position at the rear of the housing 21. As the scanning rail moves downwardly during its sensing or vote detecting sweep, each of the conducting rings 85 remains in engagement with its contact strip 89 and, in addition, each ring is contacted or engaged by a spring detent 52 whenever one of these detents has been biased or flexed inwardly by engagement with the voting key. More specifically, each of the detent fingers 52 is normally positioned so that its wiping finger 55 is out of the path of movement of the conducting ring 85. However, when one of the voting keys is moved to a selecting position, it seats within the detent notch 54 and flexes the detent finger 52 associated with that selecting position inwardly about the fixed body portion 51a secured to the rib 33. The flexing of the detent finger is, of course, effected by the inwardly extending ear 61 of the voting key which rides along the key engaging portion 53 of the detent and enters the notch 54. Thus, at each position on the voting panel where a voting key has flexed a detent spring inwardly, an electrical connection is made between the detent 51 and the contact ring 85 and through the latter contact ring to the conducting strip 89.

Figure 7:
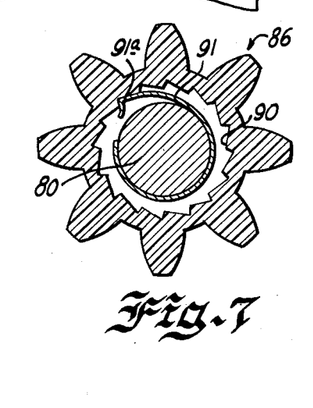
FIG. 7 is a sectional view taken along a line substantially corresponding to the line 7—7 in FIG. 2 and shows the key restoring gear on the scanning rail for returning the voting keys to their neutral or non-voting positions.
Figure 9:
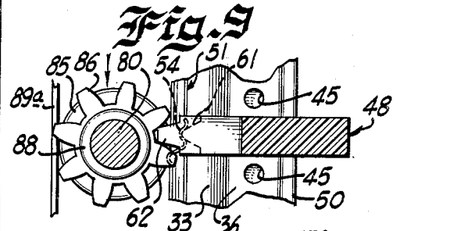

The inwardly exending key restoring tooth 62 on the voting key is disposed out of the path of movement of the conducting ring 85 but this tooth is, of course, located in the path of the key restoring gear 86. Thus, as is best shown in FIGS. 8 and 9 when the key restoring gear 86 encounters one of the voting keys during the downward sweep of the scanning mechanism 73, the tooth 62 enters the space between adjacent teeth on the key restoring gear 86 with the result that the key restoring gear is turned to permit movement of the scanning rail past the key. To permit the key restoring gear to turn freely during the downward movement of the scanning rail, a one-way drive connection of the type shown in FIG. 7 may be employed. This one-way drive connection may comprise a series of internal teeth 90 engaging the free end 91a of a spring 91 having its body portion wrapped around the scanning rail 80. The gear 86 is relatively free to turn in a counterclockwise direction as viewed in FIG. 7 since the teeth 90 merely ride over the end 91a of the spring. Thus, during the downward sweep of the scanning mechanism 73, the gears 86 of all of the units 83a, 83b, etc., encounter voting keys spaced along the column but these gears turn freely upon the rail 80 with the tooth 62 of each key entering the space between adjacent teeth on the gear 86 as is shown in FIGS. 8 and 9. As a result, the gears 86 merely roll over the voting keys without moving them out of their detent notches 54. However, when the gear 86 is turned in the reverse direction, that is, in a clockwise direction as viewed in FIG. 7, the frictional engagement between the shaft 80 and the spring 91 resists the gear rotation. Thus, during the return sweep of the scanning mechanism, when the gear 86 engages a voting key, the resistance offered against turning of the gear is sufficient to permit the gear to lift the key from its detent finger and to raise the key along the column until its upward movement is limited by the upper office stop whereupon the gear 86 turns to roll over the key to pass to the next office group.

Figure 11:
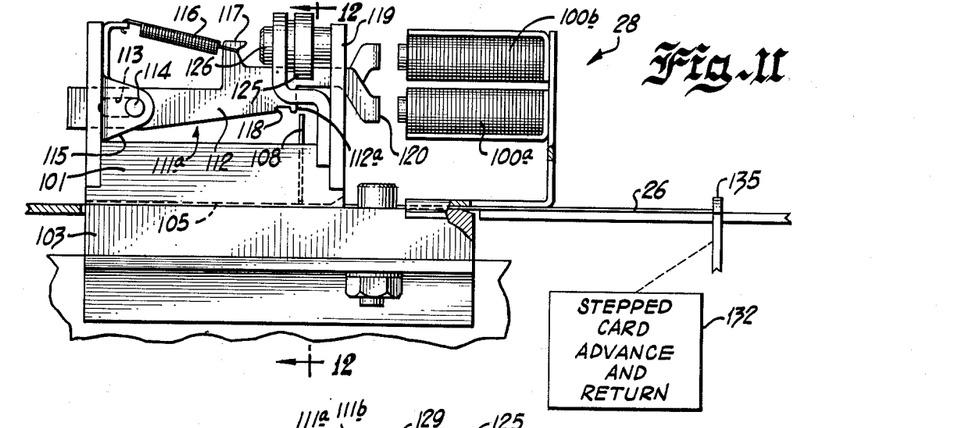
FIG. 11 is a sectional view, partially diagrammatic, illustrating the punching mechanism used in the voting machine of the present invention.
Figures 12, 13:
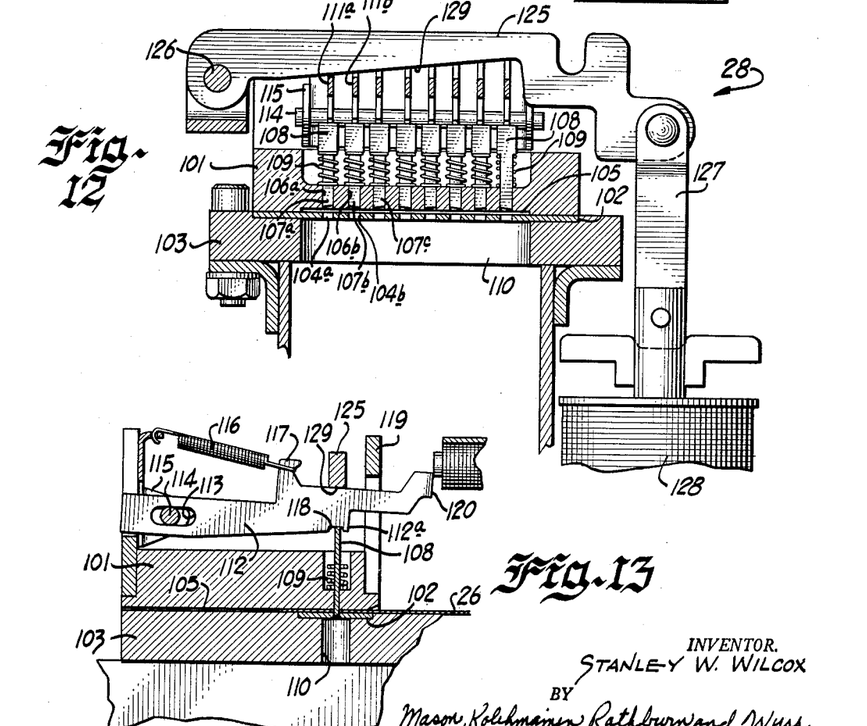
FIG. 12 is a fragmentary sectional view taken along a line substantially corresponding to the line 12—12 in FIG. 11.
FIG. 13 is a sectional view showing one of the punches being operated to form a punched hole in the ballot card.

The engagement between the contact ring 85 and the detent 51, which occurs whenever the contact rail encounters an actuated voting key, completes an electrical circuit to the punching mechanism 28 which punches a hole in the ballot card at a position corresponding to that of the actuated voting key. The punching mechanism is best shown in FIGS. 11, 12 and 13 of the drawings and preferably comprises a plurality of solenoids 100a, 100b, etc., there being one such solenoid associated with each of the columns 30a, 30b, etc. The punching mechanism 28 may be of any well known type but in the form shown comprises an upper male die carrying block 101 and a female die plate 102 carried in fixed position upon a lower support block 103. The female die plate is provided with a plurality of female die openings 104a, 104b, etc., horizontally aligned transversely of the ballot card 26. The male die block 101 is provided with a recess 105 in the bottom thereof cooperating with the female die 102 to form a card receiving passage through which the ballot card 26 passes as it is advanced through the voting machine. The male die block is further provided with a plurality of openings 106a, 106b, etc., respectively aligned with the female die openings 104a, 104b, etc. Each of the openings 106a, 106b, etc., accommodates a male punching die or plunger 107a, 107b, etc., with each plunger including an elongated stem and an upper enlarged head 108. Each male die is adapted to be moved downwardly against a biasing spring 109 interposed between its head 108 and the block 101, the downward movement being effective to drive the lower pointed end of the male die through the ballot card and into the female die opening in order to punch a hole in an obvious manner. The card chips falling from the female die openings 104a, 104b, etc., fall downwardly through an opening 110 in the lower support block 103 and may be removed following the election when the voting machine is cleaned.

Associated with each of the male punching dies 107a, 107b, etc., is a die operating knife, these knives being respectively indicated by the reference numerals 111a, 111b, etc. As is best shown in FIGS. 11 and 13, each knife comprises a body portion 112 having an elongated slot 113 therein for receiving a guide pin 114 mounted on a fixed support bracket 115. The loose connection between the guide pin 114 and the slot 113, of course, permits pivotal movement of the knife and, in addition, permits limited movement to the right from the position shown in FIG. 11. Each knife is normally biased to the position shown in FIG. 11 where the pin 114 engages the right edge of the slot 113, the biasing being accomplished by a coil spring 116 having one end carried upon the support bracket 115 and having the other end hooked around a raised finger 117 on the body portion of the knife. Thus, the spring pivots each knife about the pin 114 to its extreme counterclockwise position as viewed in FIG. 11, the pivoting being limited by engagement of the free end of the knife with a fixed plate 119. The bottom of the body portion 112 of each knife is provided with a die engaging recess 118 which engages the male die to perform the punching operation in a manner which will become obvious as the description proceeds. The bottom of each knife is also recessed as indicated at 112a to permit downward movement of the knife without operating the associated punching die as will also become evident from the ensuing description. The body portion 112 extends through a guide slot formed in a fixed support plate 119 and at the extreme right end is provided with an operating head 120 which cooperates with the solenoid associated with the knife blade to move the blade to a die engaging position against the action of the biasing spring 116. More specifically, when the solenoid 100a associated with the knife blade 111a is actuated, the head portion 120 is attracted and the knife blade is moved from the position shown in FIG. 11 to the right in order to draw the lower end of the knife blade to a position where the recess 118 overlies the upper end of the male die 107a. The solenoids associated with adjacent pairs of voting panel columns are positioned one above the other and the head portions of adjacent knives are bent in opposite directions, i.e., upwardly and downwardly as viewed in FIG. 11 in order to conserve space.

The knife blades are adapted to be driven downwardly to pivot them in unison about the pins 114 by means of an operating lever 125 which has one end mounted for pivotal movement about a fixed pivot pin 126 and has its other end attached to the operating arm 127 of a card punch solenoid 128. The operating arm 127 is normally biased upwardly so that the lever 125 does not engage any of the knife blades but when the solenoid 128 is actuated, the arm 127 pivots the lever 125 about the pin 126 to force all of the knives downwardly. The lower knife engaging surface 129 of the lever 125 is shaped so that the pivotal movements of the lever is effective to move all of the knives downwardly equal distances. Thus, all of the knives which have been moved to the right to a die actuating position by operation of their associated solenoids 100a, 100b, etc., will be driven downwardly through the ballot card when the solenoid 128 is actuated. Those knife blades which remain in the position shown in FIG. 11, that is, those blades which have not been actuated by the associated solenoids 100a, 100b, etc., will be driven downwardly by the operation of the lever but they do not engage their associated male dies since the heads 108 of these dies lie beneath the recesses 112a.

Turning now to the operation of the voting machine described above, it will be observed that the scanning rail is at the bottom of the voting panel when the voter approaches the machine and inserts his ballot card 26 through the opening 27 and into the punching mechanism 28. When the card is properly inserted the scanning mechanism moves upwardly to return all of the voting keys to their neutral or non-voting positions adjacent the upper stops of the office groups. The card is indexed by suitable mechanism (not shown) to hold it in fixed position while the voter makes his selections on the voting panel by operation of the voting keys 48, that is, by sliding the voting keys from their neutral positions to the desired selecting positions. Until the voter actuates the "Vote" switch 70 he is free to alter his selections in any desired manner. As soon as the voter is satisfied with his selections he actuates the switch 70 to complete a circuit to the electric motor 71, thus driving the chains 76 and 77 in a direction to begin the downward or vote sensing movement of the scanning mechanism 73.

Provision may also be made for punching each ballot card with holes identifying the voting station or precinct where the ballot is cast, thus permitting sorting of the ballots at the counting station. Thus, certain jurisdictions require that the order of listing of the candidates in each office group be changed from precinct to precinct within the jurisdiction. This procedure is known as "candidate rotation" and is usually required to prevent a particular candidate from gaining an advantage as a result of the listing of his name at a preferred position on the ballot throughout all of the voting stations in the jurisdiction. By altering the order of listing the candidates from station to station the effect of the preferred ballot position is minimized since each candidate will occupy this preferred position at only a portion of the voting stations and his opponent or opponents will occupy this position at other stations. The punched holes in the ballot cards, of course, identify only those selecting positions on the panel to which voting keys have been moved and, as a result, these holes do not indicate the names of the candidates selected by the voter. If the ballot cards are separated according to voting stations the candidate rotation may be accounted for in the tabulating or counting equipment which may, of course, be set up to translate the punched hole positions in the cards into candidate votes. The tabulating equipment must be supplied with information concerning the order of candidate listing represented by the ballot card in order to make the desired translation and this information is, of course, obtained by identifying the voting station at which the ballot was cast since the candidate positions at each such station are known prior to the election.

The voting station identification is punched into the ballot card by a voting key located in each of the top three horizontal rows of selecting positions on the voting panel. These three rows are covered by the top panel 21a and, hence, are not accessible to the voter. Each of the three rows represents a digit of the voting station number, the top row, for example, representing the hundreds digit, the second row the tens digit and the third row the units digit. To understand the operation, assume that the voting station is number 132 and that it is desired to punch this information into the ballot card. A voting key in the top row is placed in the first column 30a, a key in the second row is placed in the third column 30c and a key in the third row is placed in the second column 30b. These three keys are set by the election officials during programming of the machine prior to the election and are not thereafter disturbed until the election has been completed.

When the scanning mechanism 73 sweeps downwardly it is obvious that a hole will be punched in each of the three rows of the ballot card corresponding to the first three rows of selecting positions on the voting panel and, as a result, the voting station is identified. If the voting machine contains at least ten vertical columns 30a, 30b, etc., any voting station which bears a three digit number may be identified in the manner described.

Figures 14, 15, 16, 17, 18, 19:
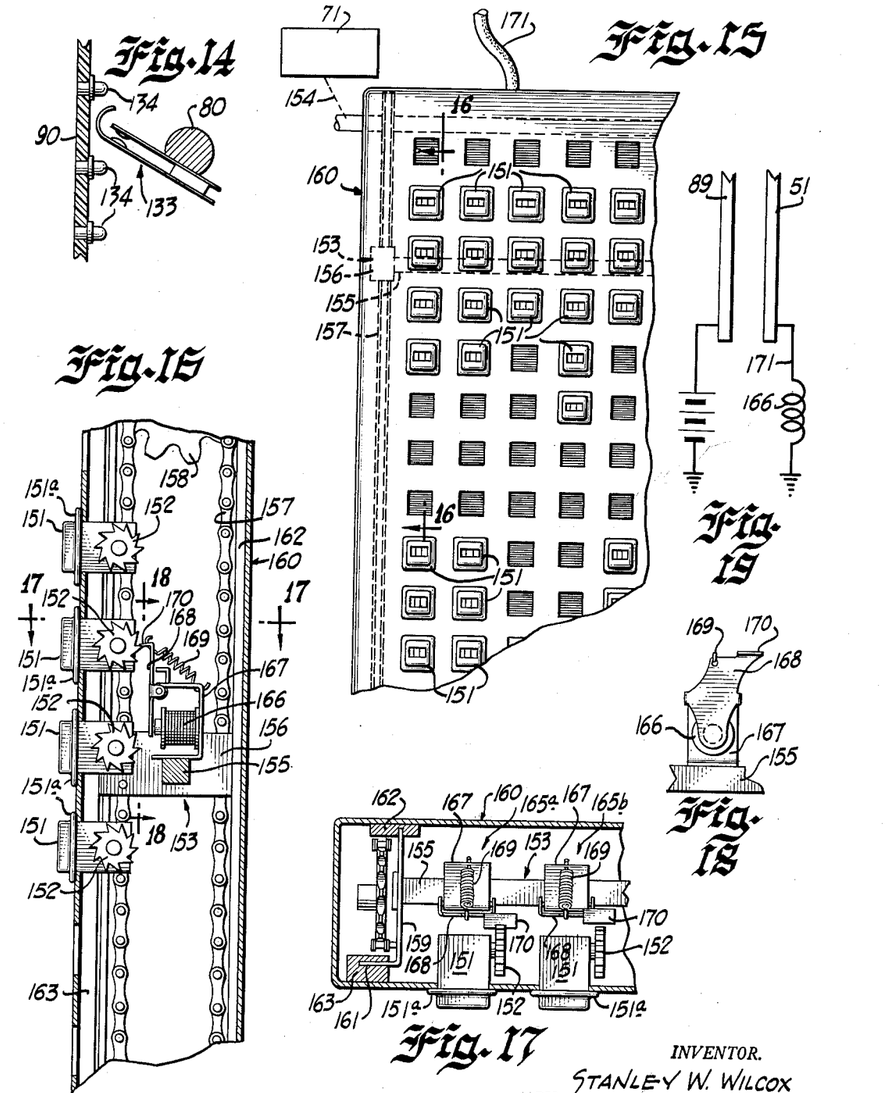
FIG. 14 is a fragmentary sectional view taken along a line substantially corresponding to the line 14—14 in FIG. 4 and showing the operation of the ballot card advance switch for controlling the step by step movement of the ballot card through the punching mechanism.
FIG. 15 is a fragmentary, partially diagrammatic view illustrating an alternative form of registering apparatus which may be used to record the voter's selections.
FIG. 16 is a fragmentary, sectional view taken along a line substantially corresponding to the line 16—16 in FIG. 15.
FIG. 17 is a fragmentary, sectional view taken along a line substantially corresponding to the line 17—17 in FIG. 16.
FIG. 18 is a fragmentary, sectional view taken along a line substantially corresponding to the line 18—18 in FIG. 16.
FIG. 19 is a simplified electrical circuit for explaining the operation of the apparatus shown in FIGS. 14 to 18.

After the scanning mechanism passes the first three horizontal rows of selecting positions, it begins to sense the voting keys selected by the voter and actuates the corresponding punches. Thus, if the voting keys in the fourth row are positioned as shown in FIG. 1, the first voted key encountered will be that located in the column 30b which is shown in a neutral or non-voted position adjacent the uppermost stop in that column. The fact that the voting key is in the neutral position may indicate either that the voter did not desire to cast his vote for any of the candidates in that particular office group or, of course, that he inadvertently neglected to make a selection. In any event, a circuit is completed to the punch solenoid 109b associated with the column 30b through the contact ring 85 and the conducting strip 89 associated with the second column thus moving the knife blade 111b to the right as viewed in FIG. 11. If other voting keys were located in this fourth horizontal row, the associated solenoids would also be actuated but with the voting keys positions as shown in FIG. 1, only the solenoid associated with the column 30b is energized. Soon after the circuit to the punch solenoid 109b is completed, the scanning rail reaches a position where a circuit is completed to energize the solenoid 128 thus pivoting the lever 125 about the pivot pin 126 to drive the actuated knife blade 111b downwardly and, hence, to force the male die 107b through the ballot card. None of the other male dies is at this time moved downwardly and as a result only one hole is punched in the ballot card for the fourth horizontal row. The hole thus punched is, of course, indicative of a neutral or non-voted key but the tabulating machine at the counting station can be set to discount this particular hole and, as a result, no votes will be counted for any of the candidates in the first office group in column 30b. The circuit for energizing the solenoid 128 may be completed in any suitable manner as, for example, by an arrangement of the type disclosed in copending application Serial No. 74,887 of the present inventor and Edward J. Crossland which application is filed simultaneously herewith and is assigned to the same assignee as the present invention. As there disclosed, the arrangement for energizing the punch solenoid includes a plurality of spaced apart pins or switch operators 130 as shown in FIGS. 2 and 14. One pin or operator 130 is provided for each of the horizontal rows and these are suitably spaced to actuate the solenoid 128 at the proper time to punch the holes in the ballot card. The pins 130 are effective to engage and operate a switch 131 carried on the scanning rail 80. The electrical circuit to the punch solenoid 128 may be controlled, for example, by use of the limit switch 74 to prevent operation of the punch solenoid during the return movement of the scanning rail. After the holes in the ballot card have been punched to correspond to the location of the voting key in the first horizontal row, the ballot card is advanced one step by a suitable step card advance and return mechanism 132 which may take any of the forms well known in this art. Thus, as is described in the above-identified application of the present inventor and Edward J. Crossland, the card advance circuit may include a stepping solenoid the circuit for which is completed by a switch 133 carried on the scanning rail. The latter switch is closed or actuated by means of spaced apart pins or fixed actuators 134 mounted on the panel 90 there being one such pin for each of the horizontal rows. The pins 134 are spaced slightly below the pins 130 for the same horizontal row so that the card advance is not actuated until the punching operation has been completed. As was previously indicated, when the switch 133 is closed a circuit is completed to a solenoid in the mechanism 132 to advance a pusher or other card moving mechanism 135 to the left as viewed in FIG. 11 thereby moving the ballot card 26 to bring a fresh area of the card beneath the male punching die. The scanning rail continues its downward movement until it reaches a position adjacent the fifth horizontal row of selecting positions at which time it detects the voting keys in this horizontal row which have been moved to a selecting position. With the voting keys positioned as shown in FIG. 1, only the voting key at the top of the column 30c is in a selecting position and, hence, only the solenoid associated with the column 30c will be energized. In view of the foregoing description, it will be apparent that energization of the solenoid 128 by the next closure of the switch 130 as the rail 80 moves downwardly is effective to drive all of the knife blades downwardly thus forcing only the male punching die 107c through the ballot card. As soon as the hole in the ballot card has been punched by the die 107c, the lever 125 is returned to its raised position as shown in FIG. 12 and the die 107c is returned to its raised position by the coil spring 109 associated therewith. Soon thereafter, the switch 133 is again closed to advance the card one more step. The horizontal scanning rail then reaches the sixth horizontal row and encounters three actuated keys so that at the time three holes are simultaneously punched in the ballot card. The operation then continues in an obvious manner until the scanning mechanism 83 reaches the end of its sweep and engages the lower limit switch 74 whereupon the drive to the motor 71 is interrupted and, at the same time, a signal may be supplied to the step card advance and return mechanism 132 to return this mechanism to its original position, thus conditioning the machine for receiving the ballot card of the next succeeding voter. The ballot card when fully advanced through the punching mechanism 28 may be deposited directly in a sealed ballot box or, in the alternative, this card may be picked up by a card advancing and allotting mechanism indicated generally by the reference numeral 140 which is effective to supply ballot cards to a sealed ballot box 141 in a manner described in detail in copending application Serial No. 74,886, filed by Guilbert M. Hunt and assigned to the same assignee as the present application.

Figure 10:
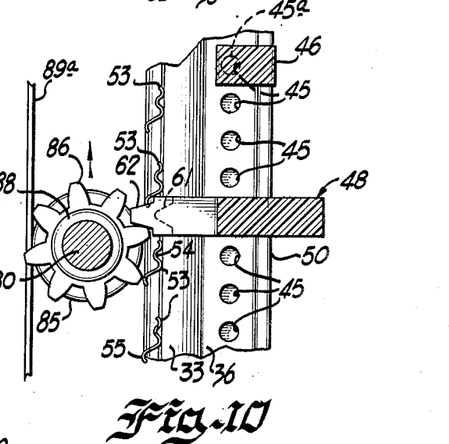
FIG. 10 is a fragmentary view similar to FIGS. 8 and 9 but illustrating the operation of the key restoring gear during the return or key restoring sweep of the scanning rail.

When the scanning rail moves upwardly after the next voter has inserted his ballot card, the key restoring gears 86 encounter the voting keys which have been moved to a selecting position. When the key restoring gear 86 engages the tooth 62 of a voting key in a selecting position the friction between the spring 91 and the rail 80 is sufficient to prevent the gear 86 from turning and, as a result, the key is lifted from the detent and is moved upwardly along the column until it reaches a position where its upward movement is limited by the next stop whereupon it is seated in its neutral position. At this point, the resistance offered by the voting key overcomes the friction of the spring 91 and, as a consequence, the gear 86 turns in a clockwise direction as viewed in FIG. 10 and rolls over the tooth 62. Thus, as the scanning mechanism 73 is raised, all of the voting keys are restored to their neutral or non-voting positions. When the scanning rail reaches its original or extreme upper position, it encounters the limit switch 75 to shut off the power to the drive motor 71.

FIGS. 15 to 18, inclusive, of the drawings illustrate an alternative arrangement for registering or recording the voter's selections. In the form of the invention there shown a tally or counter box 150 is employed containing a plurality of conventional digital counters 151 spaced apart along the bottom of the box. The tally box 150 is adapted to replace the punch mechanism 28, the ballot allotting device 140 and the sealed ballot box 141 of the machine shown in FIGS. 1 to 14, but in all other respects the voting machine illustrated in FIGS. 15 to 18 is identical to that previously described. The counters are arranged within the box 150 in columns and rows corresponding to the vertical columns and horizontal rows of selecting positions on the front panel of the voting machine. One counter is provided for each of the selecting positions containing the name of a candidate who may receive votes. Thus, it is not necessary to provide counters either at the tally box positions corresponding to the neutral positions of the voting keys or at the tally box positions corresponding to unused selecting positions on the front panel. To this end, the counters may be detachably secured to the tally box as, for example, by inserting them through suitable apertures in the bottom of the box and holding them in position in any suitable manner as by means of removable assembly screws (not shown) passing through a flange 151a on each counter which flange is seated against the bottom of the box to limit the depth of insertion and, hence, to position the counter properly within the box. The use of detachable counters, of course, requires programming or setting up the counter box prior to each election and if this proves burdensome no harm results from the providing of a box containing a full set of counters, one for each position on the voting panel, since those counters which have no meaning, i.e., those corresponding to neutral positions on the panel, may be disregarded when the election results are tabulated.

In any event each counter may be of any conventional type which provides a positive, non-ambiguous count. Usually, three digit counters are preferred with the tens digit being positively advanced one step when the units digit is driven from 9 to 0 and with the hundreds digit being positively advanced one step when the tens and units digits are driven from 99 to 00. The units digit of each counter is driven by a stepping ratchet or toothed wheel 152 which is accessible from the exterior of the counter and which is adapted to be advanced by a scanning device 153 mounted for sweeping movement within the box 150 first in a counter actuating direction and then in a return direction. The scanning device 153 is driven in synchronism with the scanning mechanism 73 described above and, to this end, the scanning device 153 is connected through a suitable mechanical drive connection represented by the broken line 154 in FIG. 15 and driven from the drive motor 71 described above. The scanning device 153 includes a horizontal rail 155 mounted at its opposed ends upon support carriages, only one of which is shown as indicated by reference numeral 156. Each of the carriages is affixed to a drive chain 157 which is trained over a sprocket 158 driven from the drive connection 154 and over an idler sprocket (not shown). The two support carriages are guided for longitudinal movement along the opposed sides of the tally box 150, for example, by means of a guide bracket 159 riding within suitable channels 160 and 161 respectively formed in fixed blocks 162 and 163 within the box. The drive connection 154 and the sprocket and chains for the scanning rail 155 are constructed and arranged to move the scanning rail continuously at such rate that it advances from one horizontal row of counters as viewed in FIG. 15 to the next as the scanning mechanism 73 progresses from one horizontal row of selecting positions to another along the voting panel. The continuous advancement of the scanning device 153 continues until the scanning mechanism 73 completes its vote detecting sweep and engages the lower limit switch 74 to reverse the direction of drive of the motor 71. When the motor 71 drives in the reverse direction both the scanning mechanism 73 and the scanning device 153 are returned to their original positions.

When the scanning device 153 is driven in the forward direction, that is, from top to bottom as viewed in FIG. 15, it is adapted to actuate all of those counter 151 which occupy positions corresponding to those selecting positions on the voting panel containing a voting key. To this end, the scanning rail 155 carries a plurality of spaced apart counter actuators 165a, 165b, etc. (FIG. 17) one such actuator being provided for each column of counters and, hence, one for each of the columns on the voting panel. While the counter actuators are identical, they may take a number of forms but as illustrated in FIG. 16 each one comprises a solenoid or relay 166 mounted upon a support bracket 167 carried by the rail 155. The bracket pivotally supports a counter actuating arm 168 which is biased to its extreme clockwise position as viewed in FIG. 16 by a spring 169 acting between the upper end of the arm and the bracket 167, the clockwise rotation of the arm being limited, of course, by engagement with a stop on the bracket. The arm carries a hooked portion 170 which is so positioned that it will not engage the toothed wheels of its associated column of counters when the solenoid 166 is deenergized. More specifically, the spring 169 normally holds the arm 168 in the position shown for the actuator 165b in FIG. 17 where the hooked portion is raised above the toothed wheel 152. When the solenoid 166 is energized, the arm 168 pivots in a counterclockwise direction as viewed in FIG. 16 so that the hooked portion 170 is disposed in a position to engage the toothed wheel 152 as shown for the actuator 165a in FIG. 17.

Each of the relays or solenoids 166 is electrically connected to its associated column on the voting panel. This connection may be made via a cable 171 shown in FIG. 15 and extending from the tally box 150 to the bottom of the voting machine panel. Thus, the relay of the actuator 165a is adapted to have the opposed ends of its operating coil respectively connected electrically to the elongated detent 51 of the column 30a and to the conducting strip 89 associated with that column, a source of power being interposed in one of the connections to supply current for operating the relay. To simplify the electrical circuit, one of the voting panel column members, i.e., either the strip 89 or the detent strip 51 may be connected through the power source to ground with the other member being connected through a single conductor in the cable 171 to one side of the relay 166, the other side of the relay being grounded. While the power source may be connected to either one of the column members, it is shown in FIG. 19 as being connected to the strip 89 with the detent strip being connected to the relay 166 through the cable. A similar connection may be made from each of the other columns 30b, 30c, etc., to the relay of the associated counter actuator 165b etc. in the tally box 150.

In view of the foregoing description, it should be apparent that during the forward sweep of the scanning device 153 a circuit will be completed to one of the counter actuators 165a, 165b, etc., whenever the scanning mechanism 73 encounters an inwardly flexed detent finger 52 holding a voting key 48. When the actuator is energized, its hooked arm 168 engages the toothed wheel of the counter lying therebeneath and as the scanning rail advances the counter reading is increased one digit, thus indicating that a vote has been cast for the candidate whose name corresponds with the selecting position occupied by the actuated voting key. Thus, each forward sweep of the scanning device 153 advances all of the counters occupying positions corresponding to the positions of voted keys and, hence, the voter's selections are effectively registered. During the return sweep of the scanning device 153 suitable means may be provided in the form of an electrical control for preventing energization of the relays 166 so that the arms 168 do not engage any of the counter wheels 152.

In view of the foregoing description, it will be observed that both forms of the apparatus described are effective to accomplish the enumerated objects of the present invention. The voting machine described is extremely simple in operation and may be constructed at relatively low cost. Elaborate mechanical interlocks between the voting selectors are unnecessary and, hence, the weight and size of the machine is considerably less than that of voting machines presently in use. The use of a scanning rail and an associated registering mechanism operated in synchronism therewith avoids excessive wiring or mechanical connections which would otherwise be required. Thus, the scanning arrangement contributes to the reduction in size, weight and cost of the machine.

While particular embodiments of the invention have been illustrated and described, it will be apparent that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a voting machine of the type utilizing a ballot for recording the voter's selections, the combination of means defining a plurality of side by side columns each divided into a number of selecting positions, means on each column dividing the selecting positions of that column into different office groups, at least some of said columns containing a plurality of office groups, the selecting positions being arranged in rows extending normal to the columns, manually operable selectors in each column whereby the voter makes his selection at the selecting positions of each office group, means for simultaneously scanning all of said columns, one row at a time, to determine which of the selecting positions has been selected by the voter, and recording means including a plurality of recording devices for recording upon said ballot the selecting positions selected by the voter.

2. The apparatus defined by claim 1 wherein selectors in a group of said rows are positioned at preselected positions which remain fixed throughout an election in order to operate said recording means when said group of rows are scanned, thereby to record auxiliary information on said ballot.

3. The structure defined by claim 1 wherein the selectors are mounted for sliding movement longitudinally along each column from a non-voting position to one of said selecting positions.

4. The structure defined by claim 3 wherein a plurality of adjustable office stops are mounted in fixed position spaced longitudinally of each column to divide each column into the different office groups, each selector being disposed adjacent one of said stops when in its non-voting position.

5. The structure defined by claim 3 wherein detent means are provided along each column for holding the selectors in their selecting positions.

6. The structure defined by claim 4 wherein detent means are provided along each column for holding the selectors in their selecting positions.

7. The apparatus defined by claim 1 wherein said scanning means comprises a rail extending transversely of said columns and movable from a position near one end of said columns to a position near the other end to traverse the rows of selecting positions.

8. The apparatus defined by claim 7 wherein selectors in a group of said rows are positioned at preselected positions which remain fixed throughout an election in order to operate said recording means when said group of rows are scanned, thereby to record auxiliary information on said ballot.

9. The structure defined by claim 7 wherein the selectors are mounted for sliding movement longitudinally along each column from a non-voting position to one of said selecting positions.

10. The structure defined by claim 9 wherein a plurality of adjustable office stops are mounted in fixed positions spaced longitudinally of each column to divide each column into the different office groups, each selector being disposed adjacent one of said stops when in its non-voting position.

11. The structure defined by claim 9 wherein detent means are provided along each column for holding the selectors in their selecting positions.

12. The structure defined by claim 10 wherein detent means are provided along each column for holding the selectors in their selecting positions.

13. In a voting machine of the type utilizing a ballot for recording the voter's selections, the combination of means defining a plurality of side by side columns each divided into a number of selecting positions, means on each column dividing the selecting positions of that column into different office groups, at least some of said columns containing a plurality of office groups, manually operable selectors in each column whereby the voter makes his selection at said selecting positions within each office group, means for simultaneously scanning all of said columns to determine which of the selecting positions has been selected by the voter, and recording means operated in synchronism with the scanning means for recording upon said ballot the selecting positions selected by the voter.

14. In a voting machine of the type utilizing a ballot for recording the voter's selections, the combination of means defining a plurality of side by side columns each divided into a number of selecting positions, means on each column dividing the selecting positions of that column into different office groups, at least some of said columns containing a plurality of office groups, manually operable selectors slideable longitudinally along each column whereby the voter makes his selection at said selecting positions within each office group, scanning means for determining which of the selecting positions has been selected by the voter, and recording means operated in synchronism with said scanning means for recording upon said ballot the selecting positions selected by the voter.

15. The structure defined by claim 14 which additionally includes a plurality of adjustable stops mounted in fixed positions spaced longitudinally along each column to limit the sliding movement of said selectors.

16. The structure defined by claim 14 which additionally includes detent means extending along each column for holding the selectors in their selecting positions.

17. The structure defined by claim 15 which additionally includes detent means extending along each column for holding the selectors in their selecting positions.

18. In a voting machine of the type utilizing a ballot for recording the voter's selections, the combination of means defining a plurality of side by side columns each divided into a number of selecting positions, means on each column dividing the selecting positions of that column into different office groups, at least some of said columns containing a plurality of office groups, manually operable selectors slideable longitudinally along each column whereby the voter makes his selection at said selecting positions, means including at least one scanning device movable longitudinally along said columns from a position near one end to a position near the other end for simultaneously scanning all of said columns to determine which of the selecting positions has been selected by the voter, and recording means operated in synchronism with said scanning device for recording upon said ballot the selecting positions selected by the voter.

19. The structure defined by claim 18 which additionally includes a plurality of adjustable stops mounted in fixed positions spaced longitudinally along each column to limit the sliding movement of said selectors.

20. The structure defined by claim 18 which additionally includes detent means extending along each column for holding the selectors in their selecting positions.

21. The structure defined by claim 19 which additionally includes detent means extending along each column for holding the selectors in their selecting positions.

22. In a voting machine, the combination of a voting panel made up of a number of different side by side columns, a plurality of selecting devices mounted for manual sliding movement longitudinally along each column to different selecting positions to enable the voter to make a selection, scanning means movable longitudinally along said columns from a position near one end to a position near the other end to determine which of the selecting positions has been selected by the voter, and vote recording means operated by said scanning means.

23. In a voting machine, the combination of a voting panel made up of a plurality of side by side columns each containing a number of selecting positions forming a plurality of office groups, a plurality of selectors mounted for manual sliding movement along each column, there being at least one such selector for each office group, detent means for holding each selector in the selecting positions within each office group to enable the voter to make a selection, scanning means movable along said columns in one direction to determine the voter's selections, said scanning means being movable along said columns in a reverse direction and including means for moving all of said selectors out of their selecting position when said scanning means is moved in said reverse direction.

24. In a voting machine, the combination of a voting panel made up of a number of different side by side columns, stop means adjustable along each column for dividing each column into different office groups, a plurality of selectors mounted for manual sliding movement along each column, there being at least one such selector for each office group, detent means for holding each selector in any one of a plurality of selecting positions within each office group to enable the voter to make a selection, scanning means movable along said columns in one direction to determine the voter's selections, said scanning means being movable along said columns in a reverse direction and including means for moving all of said selectors out of their selecting position when said scanning means is moved in said reverse direction.

25. In a voting machine, the combination of a voting panel made up of a number of different side by side columns, stop means adjustable along each column for dividing each column into different office groups, a plurality of selectors mounted for manual sliding movement along each column from a neutral position located adjacent one of the stop means to a selecting position, there being at least one such selector for each office group, means including a scanning device movable along said columns in one direction to determine the voter's selections, said scanning device being movable along said columns in a reverse direction and including means for returning all of said selectors from the selecting positions to their neutral position when said scanning device is moved in said reverse direction, the return movement of said selectors being limited by said stop means.

26. In a voting machine, the combination of a voting panel made up of a number of different side by side columns and said columns containing different office groups, a plurality of selectors mounted for manual sliding movement along each column from a non-voting position to a voting position, there being at least one such selector for each office group, means including a scanning device movable along said columns in one direction to determine the voter's selections, said scanning device being movable along said columns in a reverse direction and including means for returning to their non-voting positions all of the selectors which have been moved to their voting positions.

27. In a voting machine, the combination of a voting panel made up of a number of different side by side columns, stop means adjustable along each column for dividing each column into different office groups, a plurality of selecting devices mounted for manual sliding movement longitudinally along each column, there being at least one such device for each office group, each selecting device being movable along its column to any one of a plurality of selecting positions within each office group to enable the voter to make a selection, scanning means movable longitudinally along said columns from a position near one end to a position near the other end to determine which of the selecting positions has been selected by the voter, and vote recording means operated by said scanning means.

28. In a voting machine, the combination of a voting panel made up of a number of different side by side columns, stop means adjustable along each column for dividing each column into different office groups, a plurality of selecting devices mounted for manual sliding movement longitudinally along each column, there being at least one such device for each office group, each selecting device being movable along its column to any one of a plurality of selecting positions within each office group to enable the voter to make a selection, detent means for holding each of the selecting devices in the selecting position chosen, scanning means movable longitudinally along said columns from a position near one end to a position near the other end to determine which of the selecting positions has been selected by the voter, and vote recording means operated by said scanning means.

29. In a voting machine of the type utilizing a ballot card for recording the voter's selections, the combination of means defining a plurality of side by side columns each divided into a number of selecting positions, manually operable means in each column whereby the voter makes his selection upon said selecting positions, means including at least one scanning device movable longitudinally along said columns from a position near one end to a position near the other end for simultaneously scanning all of said columns to determine which of the selecting positions has been selected by the voter, and electrically operated recording means including a plurality of recording devices for recording upon said ballot the selecting positions selected by the voter, the last named means including an electrical circuit for supplying current to one of said recording devices for each of the selecting positions selected by the voter.

30. In a voting machine, the combination of means defining a plurality of side by side columns each divided into a number of selecting positions, manually operable means in each column whereby the voter makes his selection upon said selecting positions, means including at least one scanning device movable longitudinally along said columns from a position near one end to a position near the other end for simultaneously scanning all of said columns to determine which of the selecting positions has been selected by the voter, and electrically operated vote recording means including a plurality of recording devices for recording the voter's selections, the last named means including an electrical circuit for supplying current to one of said recording devices for each of the selecting positions selected by the voter.

31. In a voting machine, the combination of means defining a plurality of side by side columns each divided into a number of selecting positions, means on each column dividing the selecting positions of that column into different office groups, at least some of said columns containing a plurality of office groups, the selecting positions being arranged in rows extending normal to the columns, manually operable selectors in each column whereby the voter makes his selection at the selecting positions of each office group, means for simultaneously scanning all of said columns, one row at a time, to determine which of the selecting positions has been selected by the voter, and vote recording means operated in synchronism with the movement of said scanning means for recording the voter's selections.

32. The structure defined by claim 31 wherein the selectors are mounted for sliding movement longitudinally along each column from a non-voting position to one of said selecting positions.

33. The structure defined by claim 32 wherein a plurality of adjustable office stops are mounted in fixed positions spaced longitudinally of each column to divide each column into the different office groups, each selector being disposed adjacent one of said stops when in its non-voting position.

34. The structure defined by claim 32 wherein detent means are provided along each column for holding the selectors in their selecting positions.

35. The apparatus defined by claim 31 wherein said scanning means comprises a rail extending transversely of said columns and movable from a position near one end of said columns to a position near the other end to traverse the rows of selecting positions.

36. The structure defined by claim 35 wherein the selectors are mounted for sliding movement longitudinally along each column from a non-voting position to one of said selecting positions.

37. The structure defined by claim 36 wherein a plurality of adjustable office stops are mounted in fixed positions spaced longitudinally of each column to divide each column into the different office groups, each selector being disposed adjacent one of said stops when in its non-voting position.

38. The structure defined by claim 36 wherein detent means are provided along each column for holding the selectors in their selecting positions.

39. In a voting machine, at least one column containing selecting positions forming a plurality of office groups, a plurality of selectors mounted for manual sliding movement longitudinally along said column from a non-voting position to a selecting position, there being at least one such selector for each office group, means including a scanning device movable along said column in one direction to determine the voter's selections, said scanning device being movable along said column in a reverse direction and including means for returning to their non-voting positions all of the selectors which have been moved to their selecting positions.

40. The structure defined by claim 39 wherein a plurality of adjustable stops are mounted in fixed positions spaced longitudinally of said column to divide said column into the different office groups, the return movement of said selectors to their non-voting positions being limited by said stops.

41. The structure defined by claim 39 wherein detent means are provided along said column for holding the selectors in their selecting positions.

42. The structure defined by claim 40 wherein detent means are provided along said column for holding the selectors in their selecting positions.

References Cited in the file of this patent

UNITED STATES PATENTS

| | | |
|---|---|---|
| 628,032 | Phelps | July 4, 1899 |
| 783,156 | Taisey | Feb. 21, 1905 |
| 2,203,707 | Thompson | June 11, 1940 |
| 2,326,204 | Dowey et al. | Aug. 10, 1943 |